O. E. ST. JOHN & F. NORTON.
MACHINE FOR MAKING BASKET BLANKS.
APPLICATION FILED JUNE 10, 1914.
1,161,749.
Patented Nov. 23, 1915.
14 SHEETS—SHEET 1.
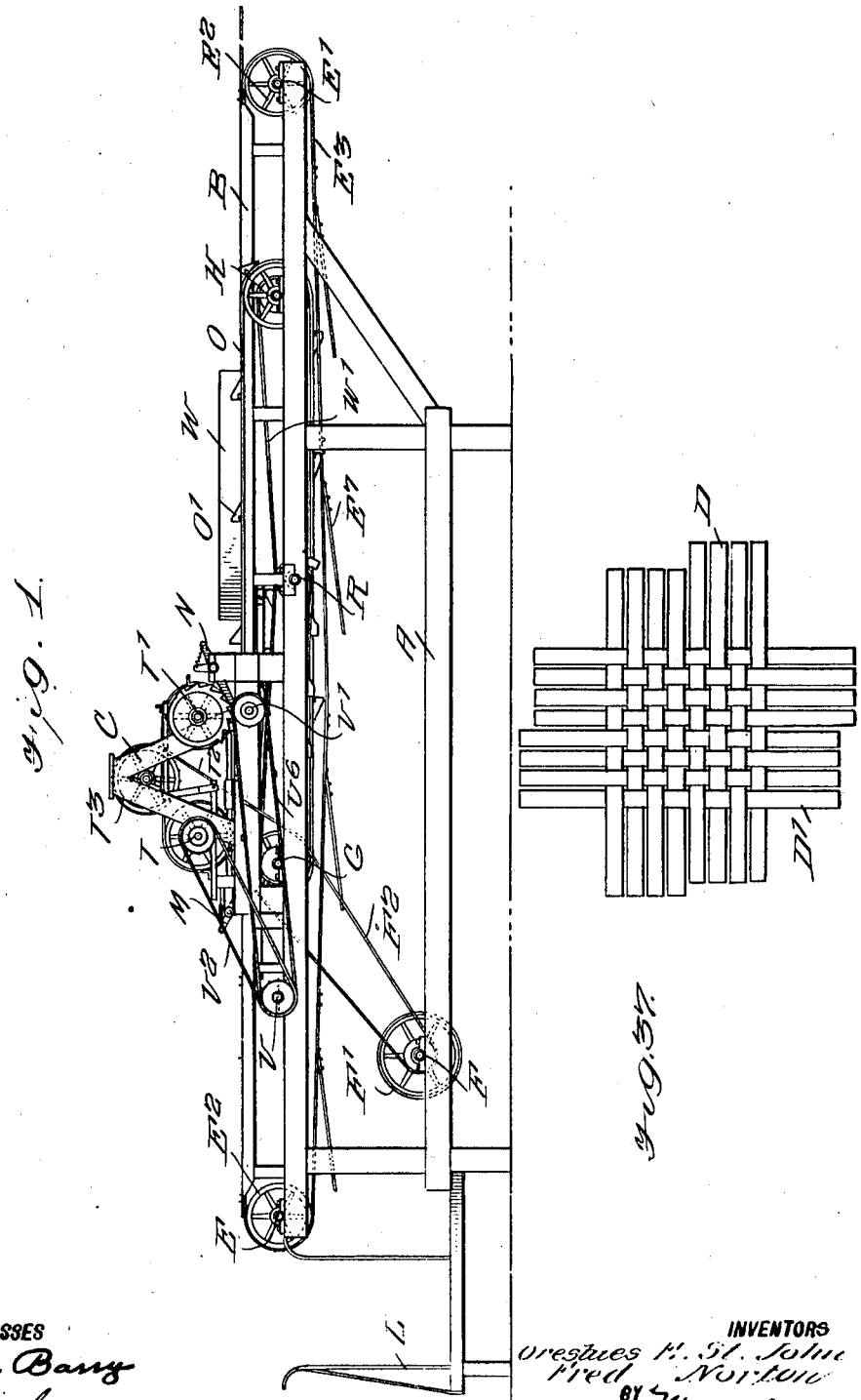
WITNESSES
INVENTORS
Orestes E. St. John
Fred Norton
BY
ATTORNEYS

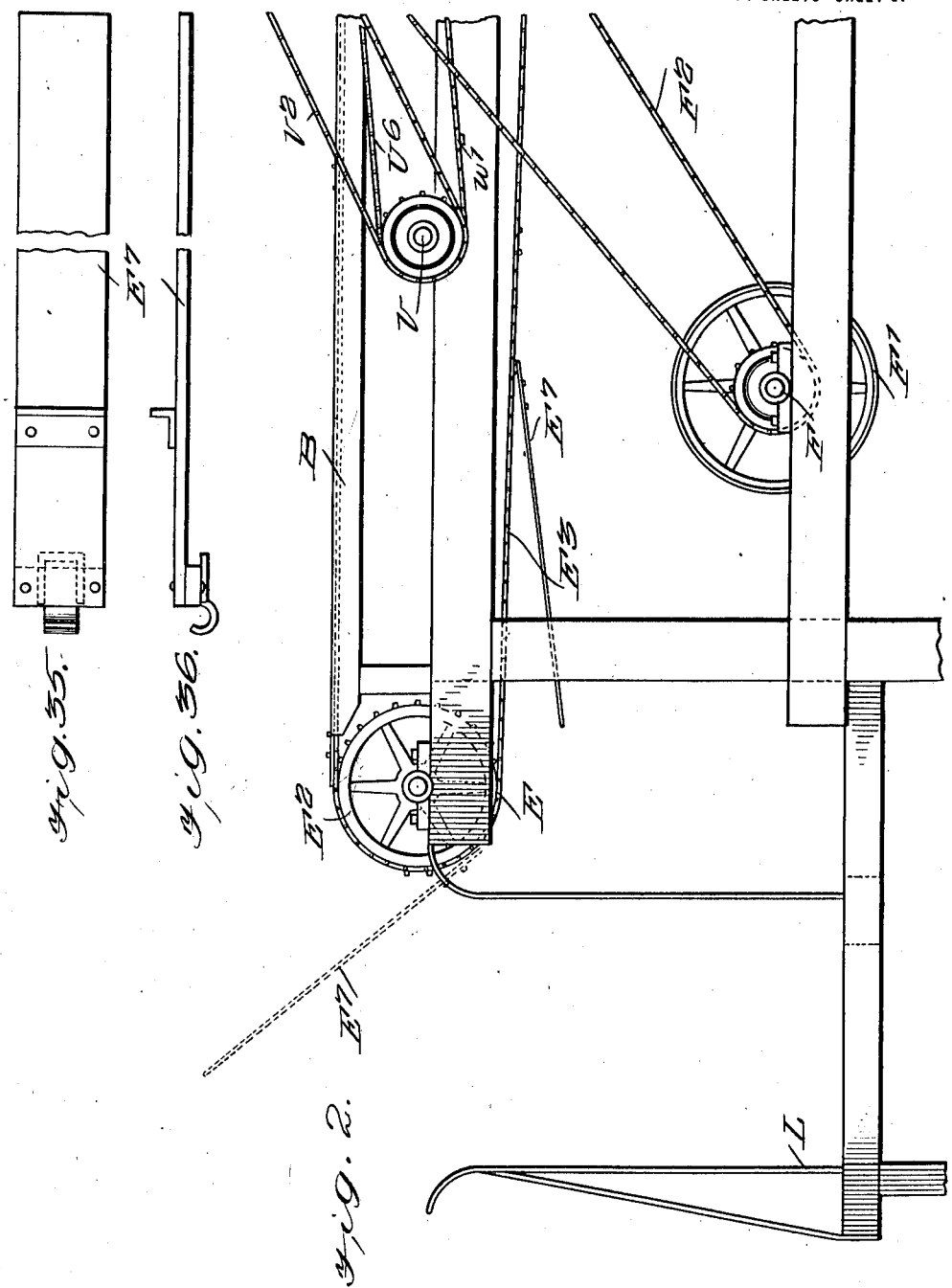

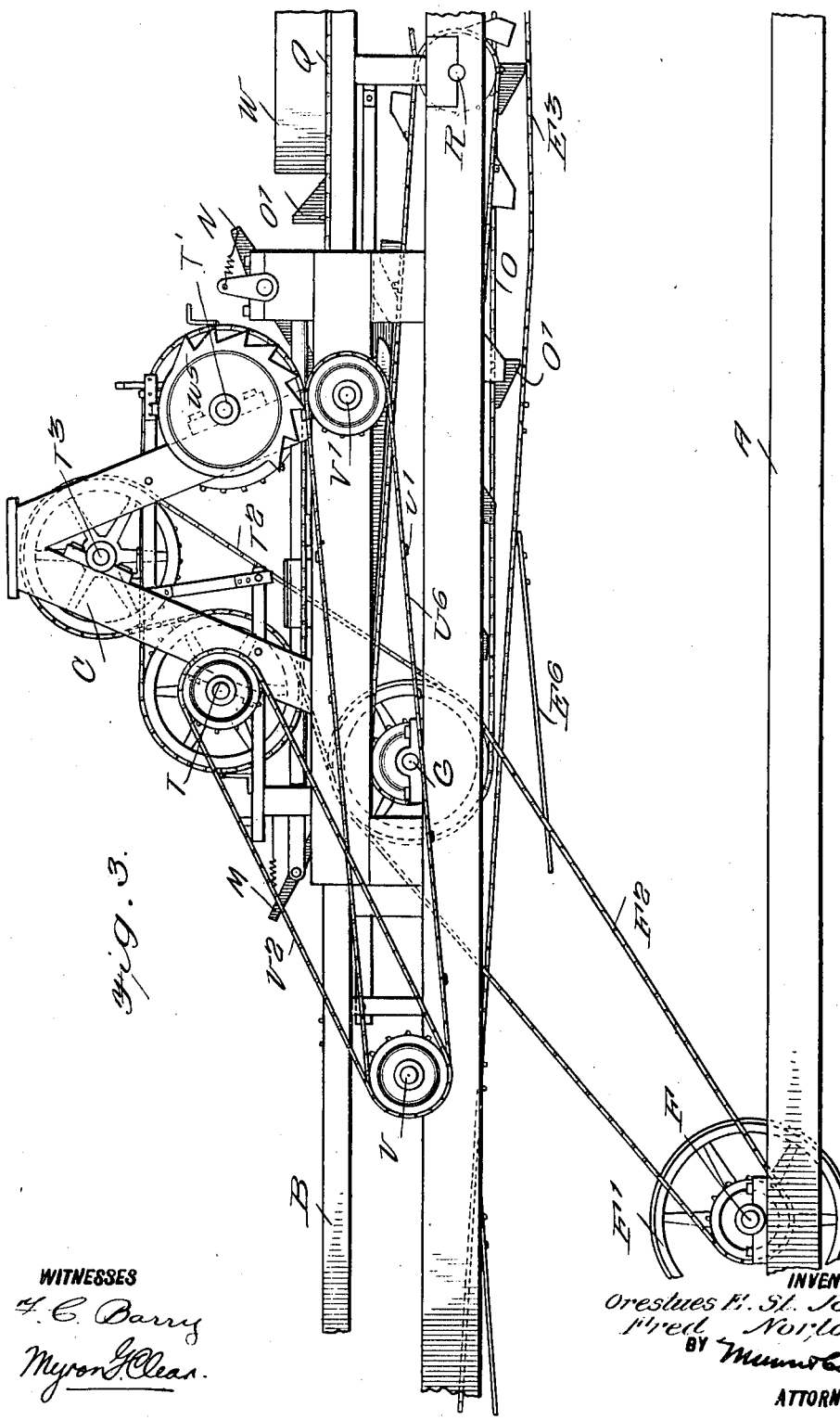

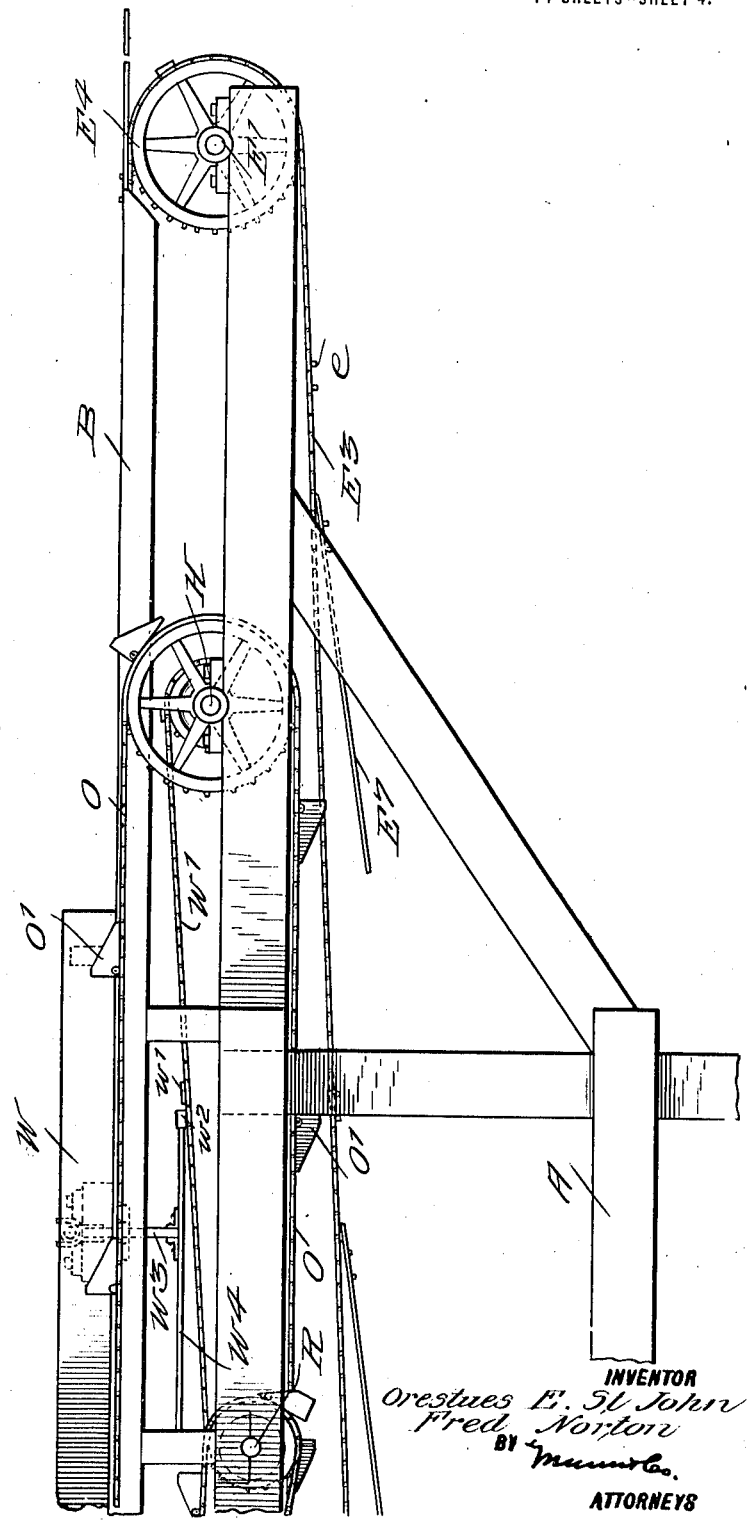

O. E. ST. JOHN & F. NORTON.
MACHINE FOR MAKING BASKET BLANKS.
APPLICATION FILED JUNE 10, 1914.
1,161,749.
Patented Nov. 23, 1915.
14 SHEETS—SHEET 5.
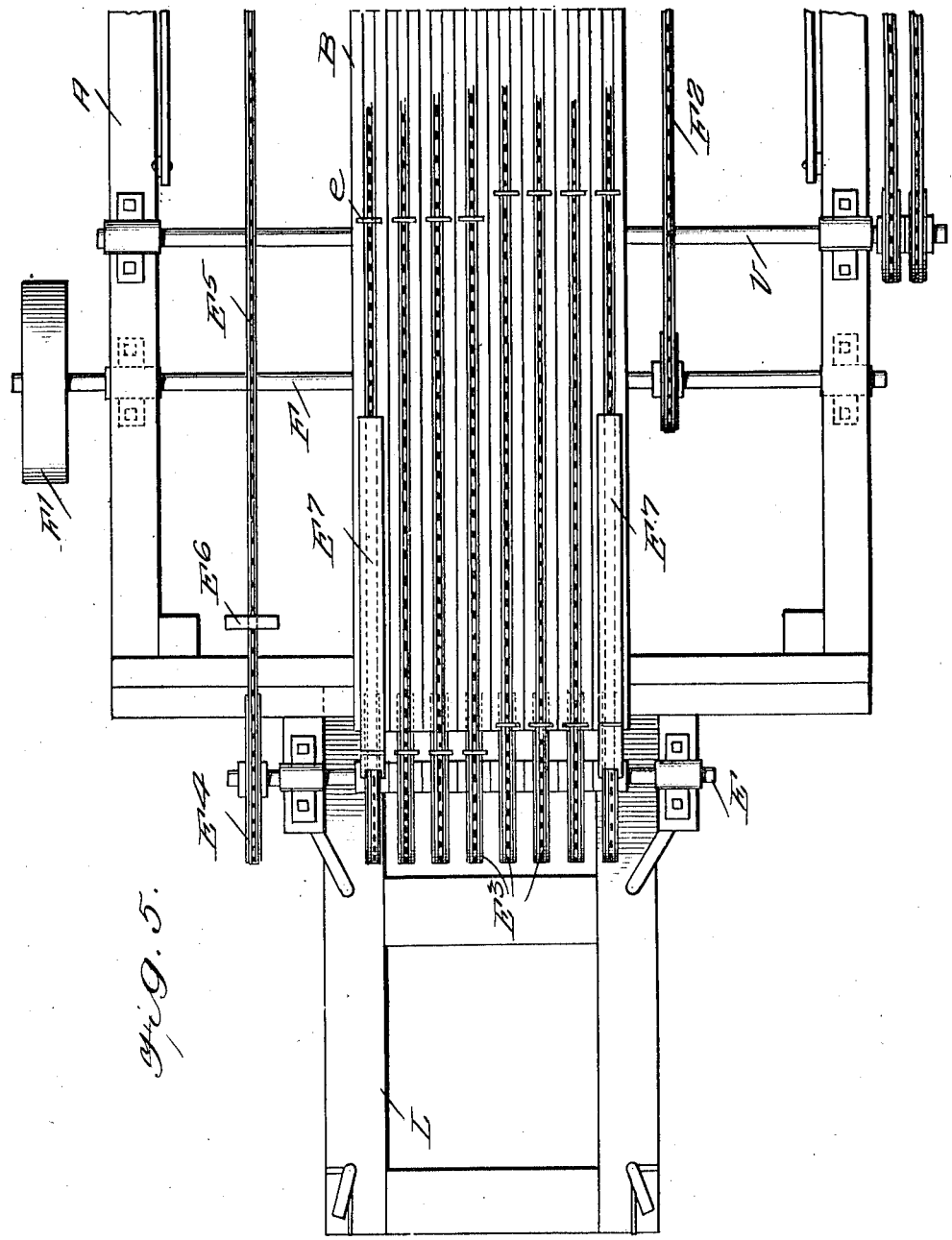
WITNESSES
INVENTORS
ATTORNEYS

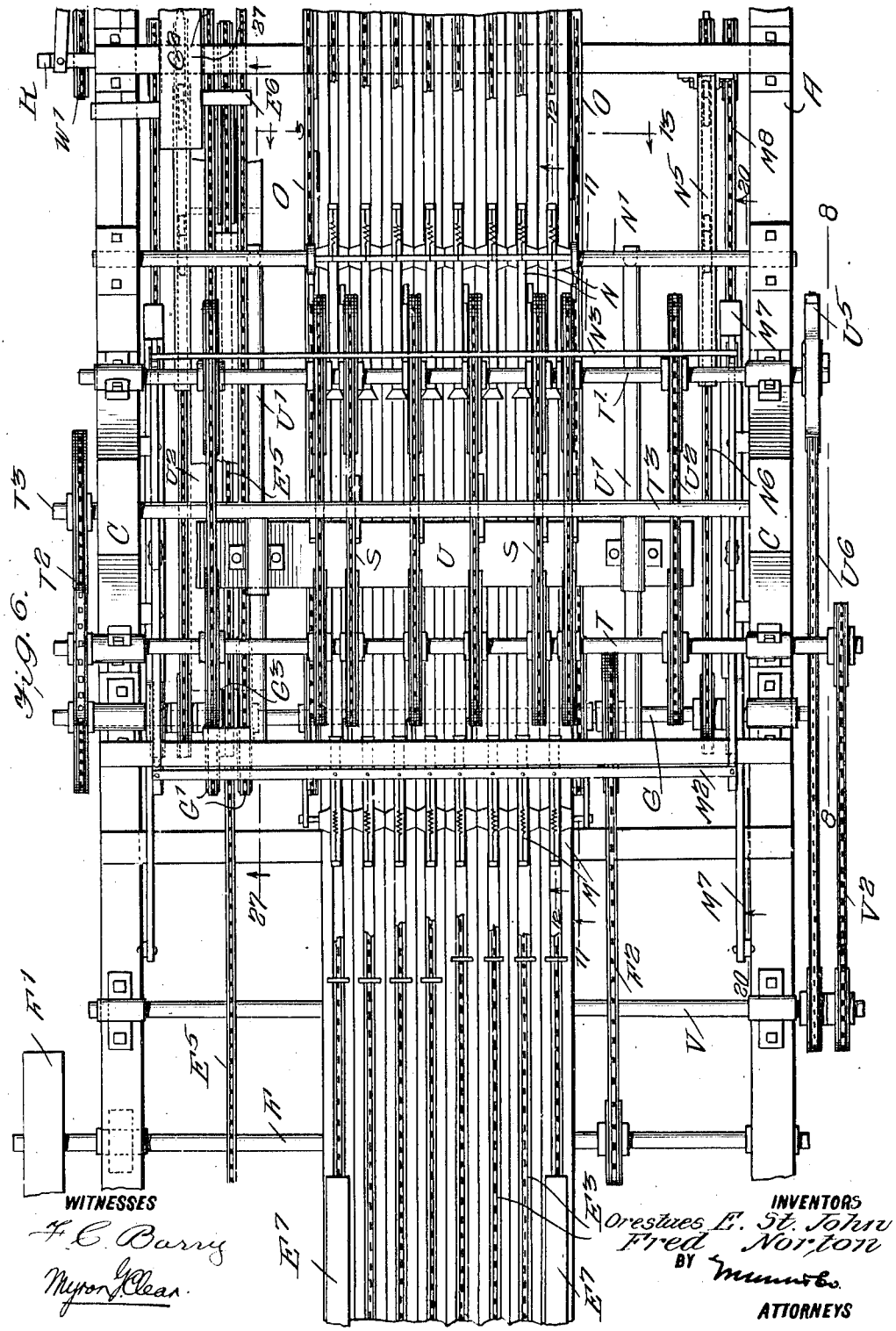

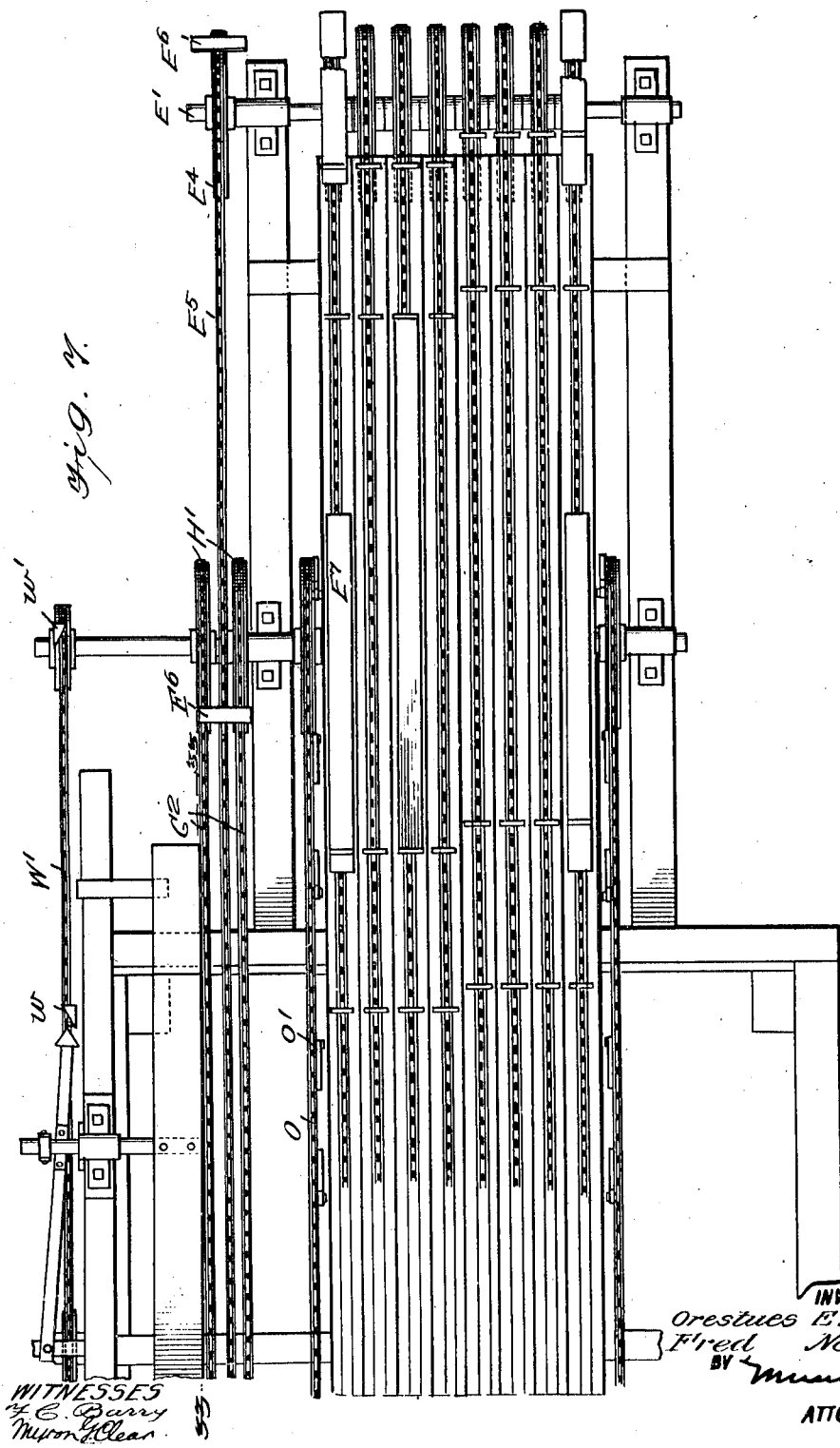

O. E. ST. JOHN & F. NORTON.
MACHINE FOR MAKING BASKET BLANKS.
APPLICATION FILED JUNE 10, 1914.
1,161,749.
Patented Nov. 23, 1915.
14 SHEETS—SHEET 8.
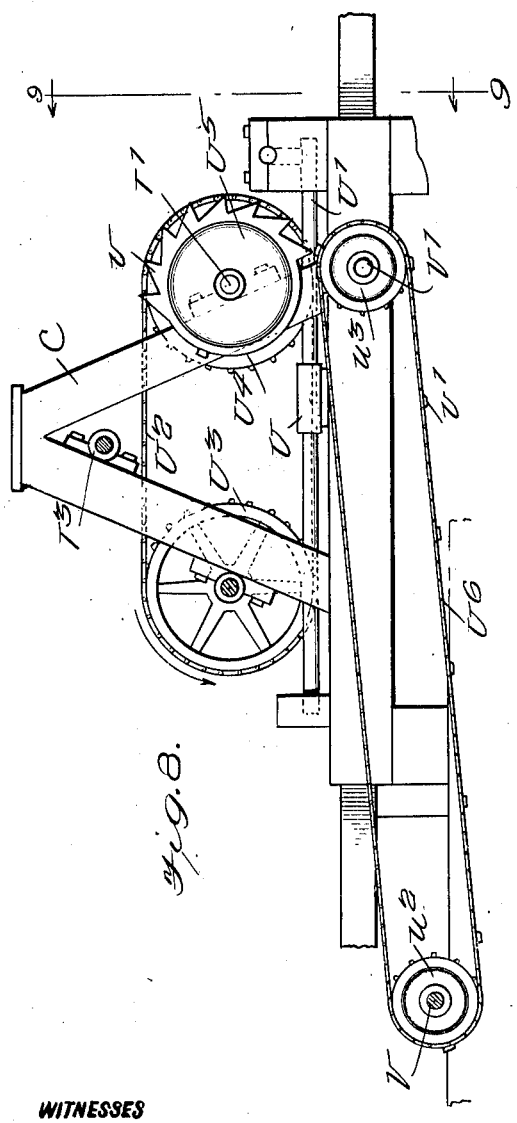
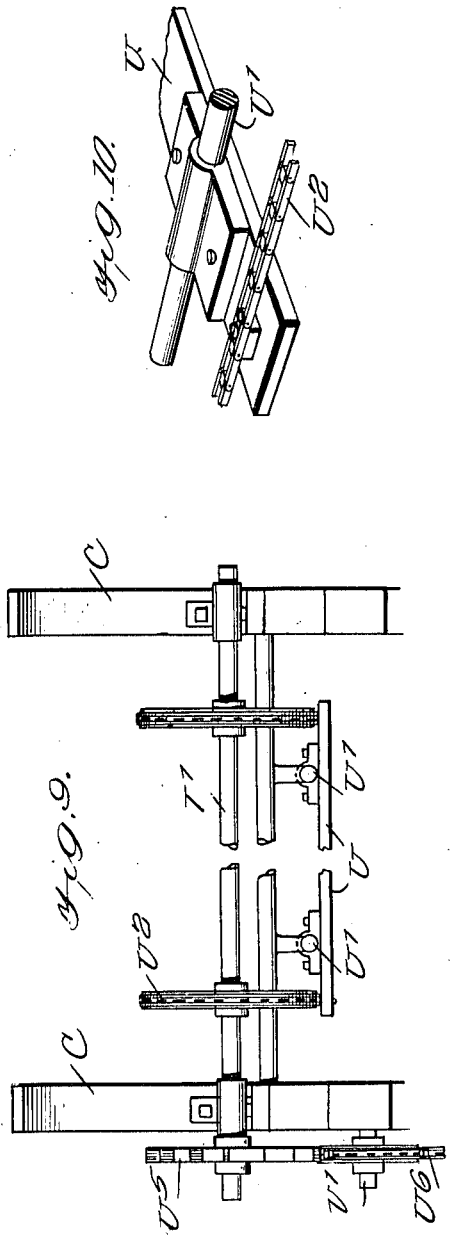

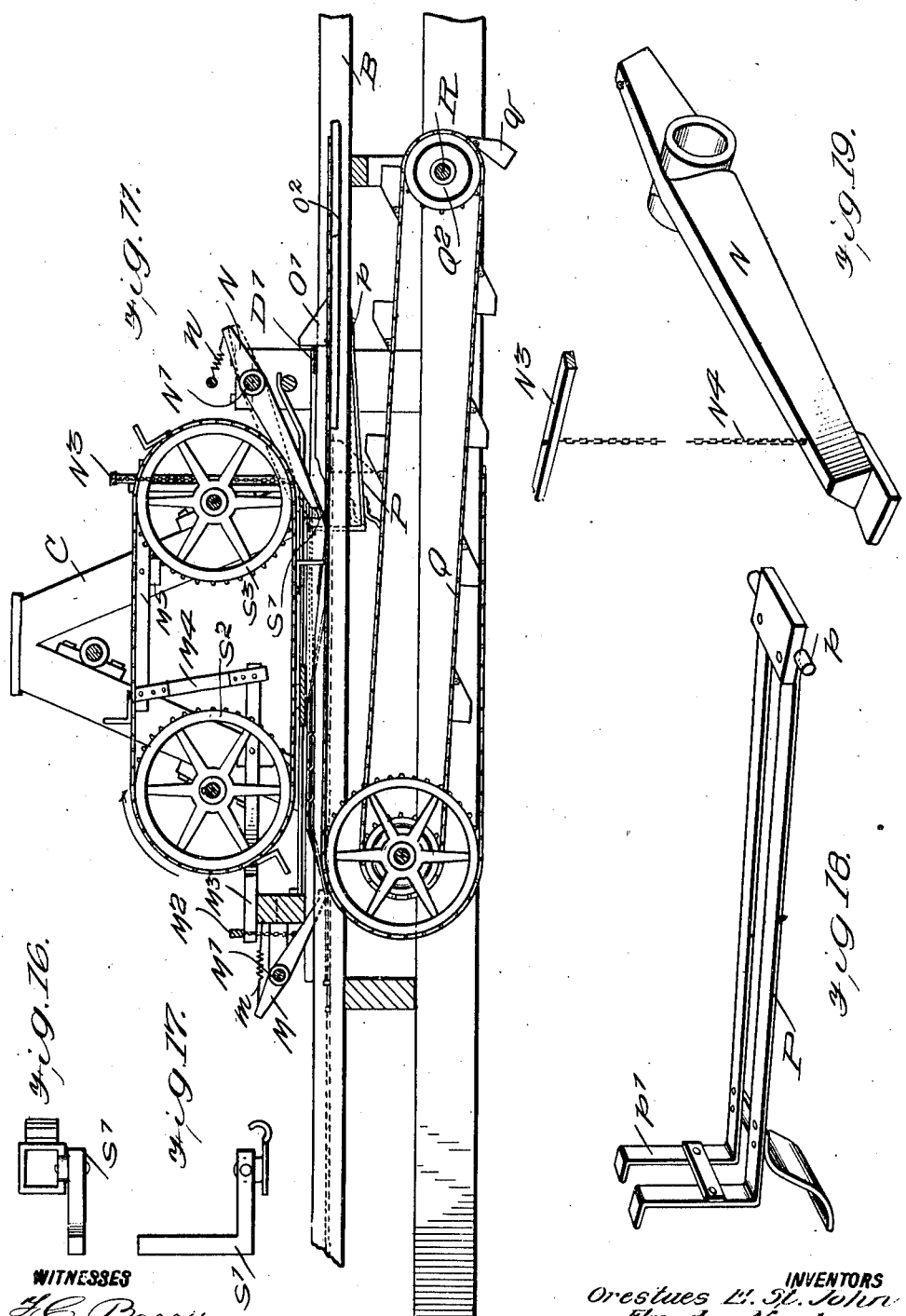

O. E. ST. JOHN & F. NORTON.
MACHINE FOR MAKING BASKET BLANKS.
APPLICATION FILED JUNE 10, 1914.
1,161,749.
Patented Nov. 23, 1915.
14 SHEETS—SHEET 10.
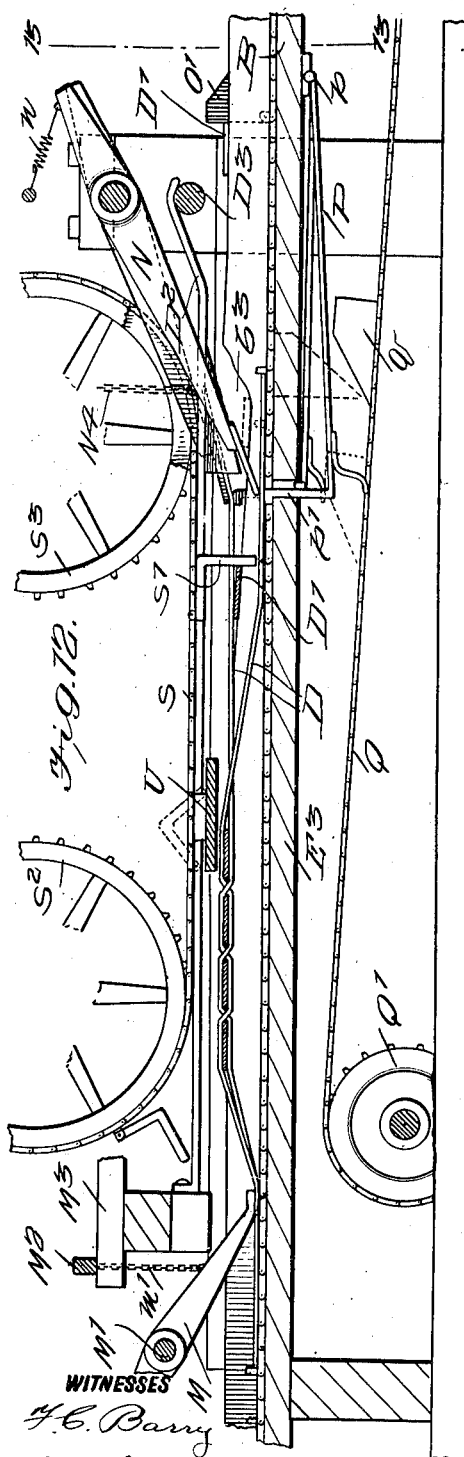
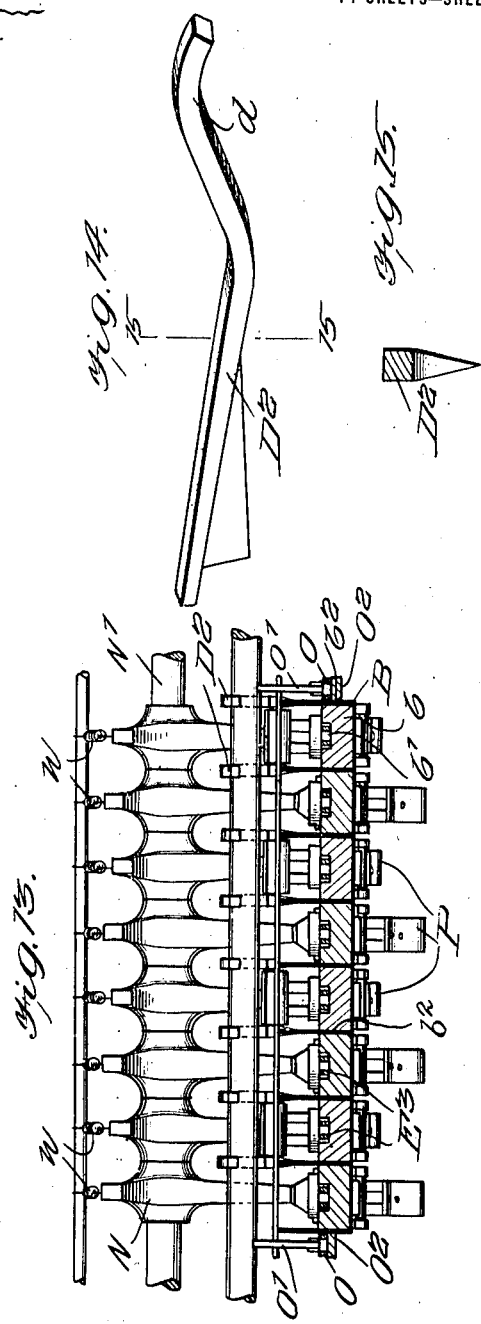
WITNESSES
INVENTORS
Orestues E. St. John
Fred Norton
BY
ATTORNEYS

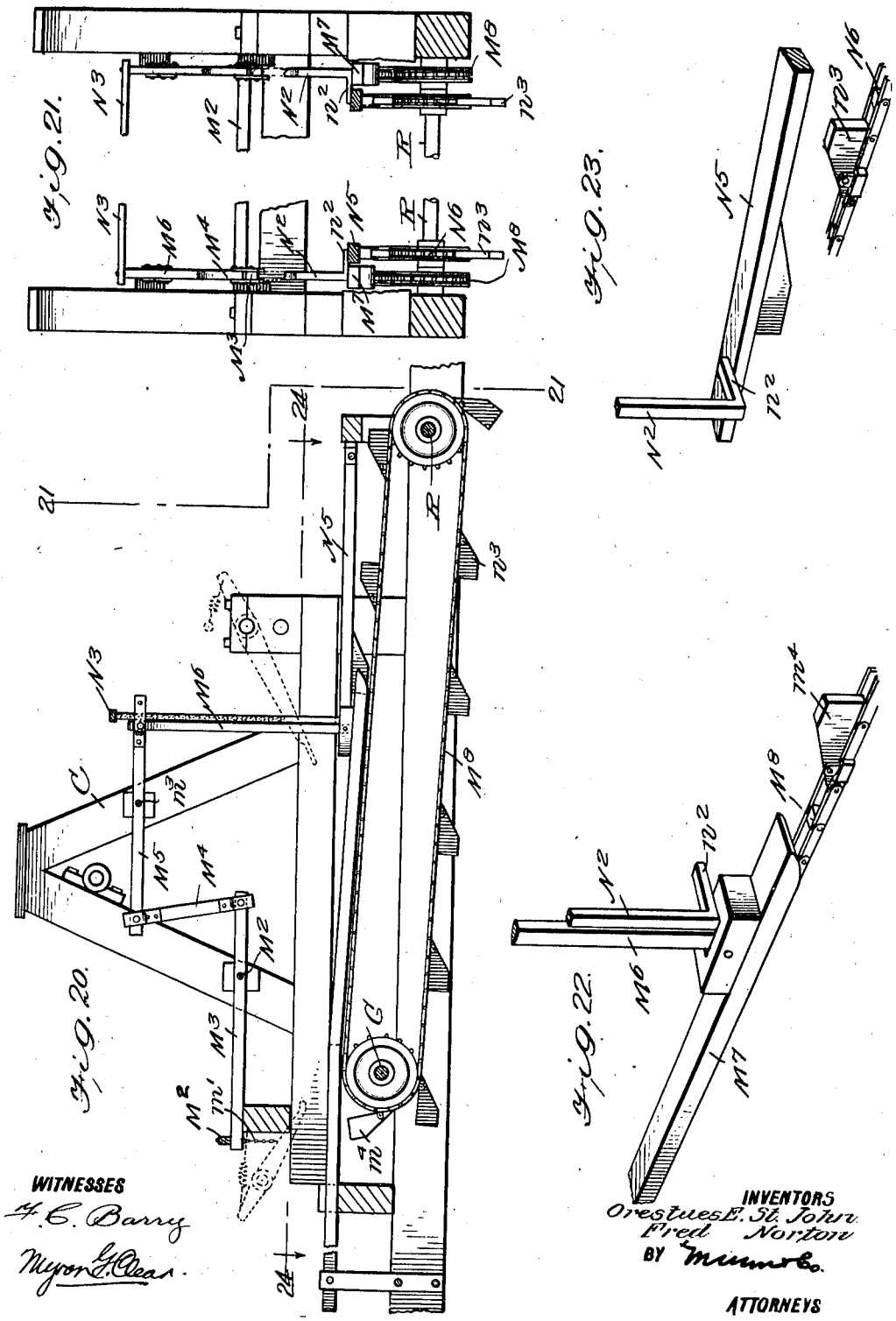

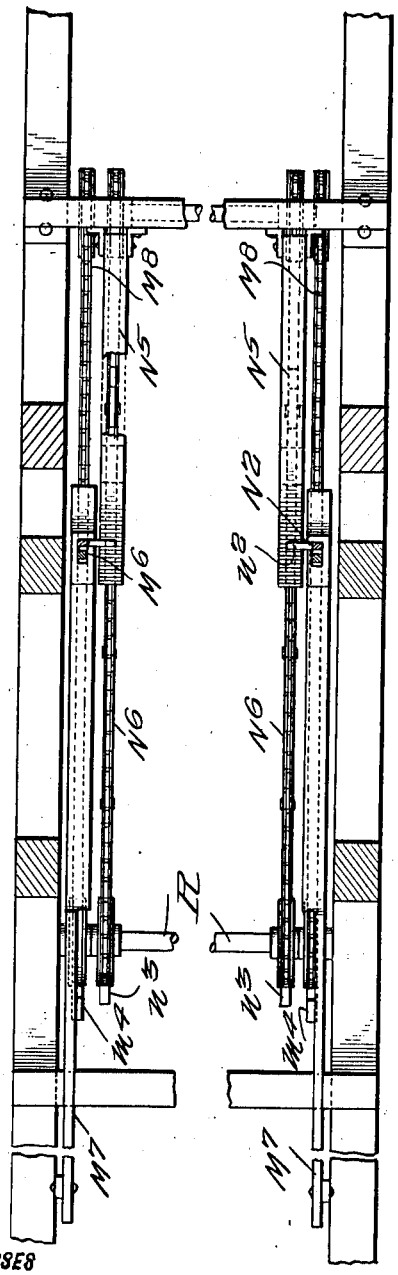
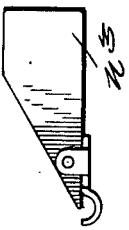

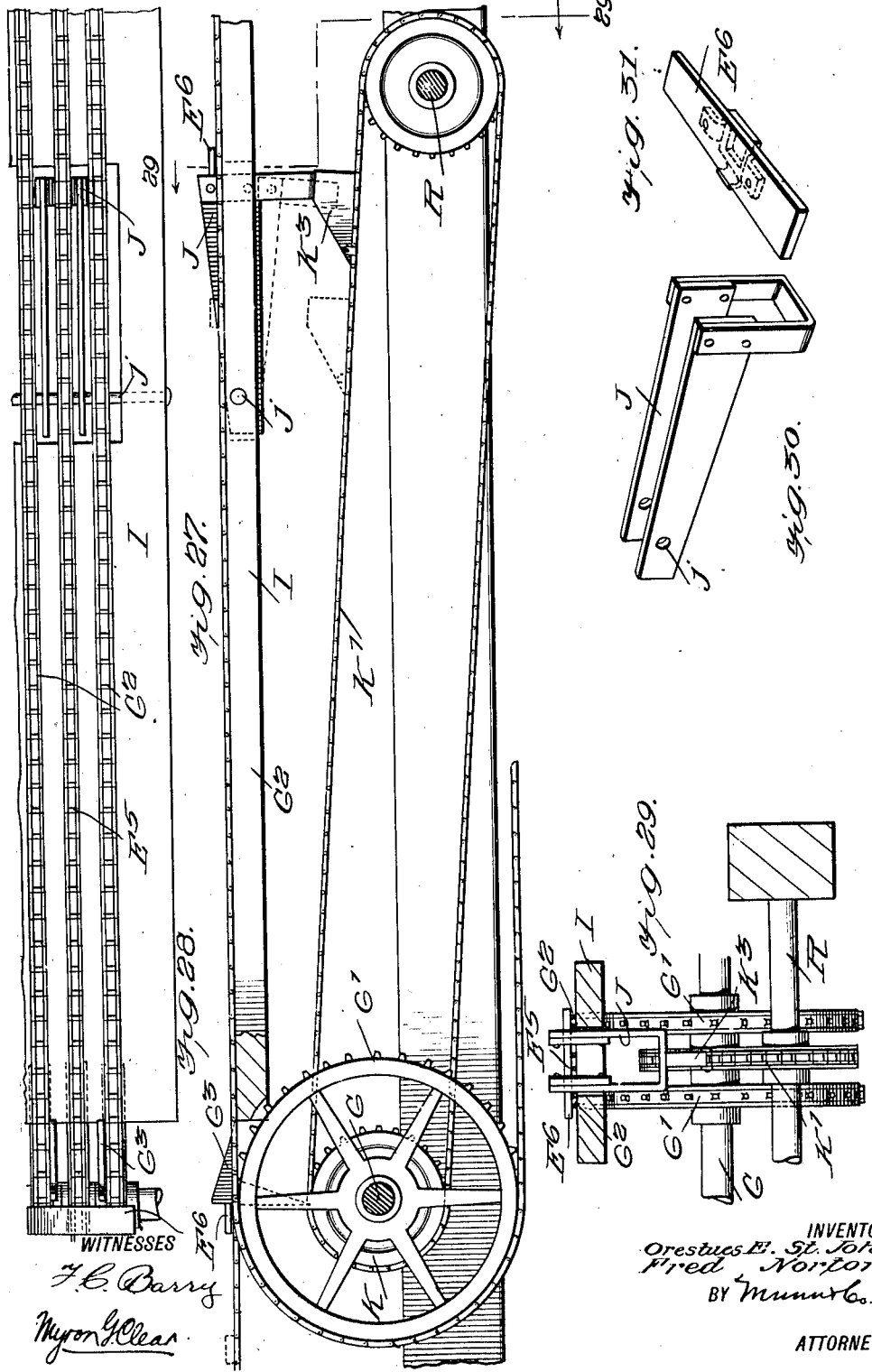

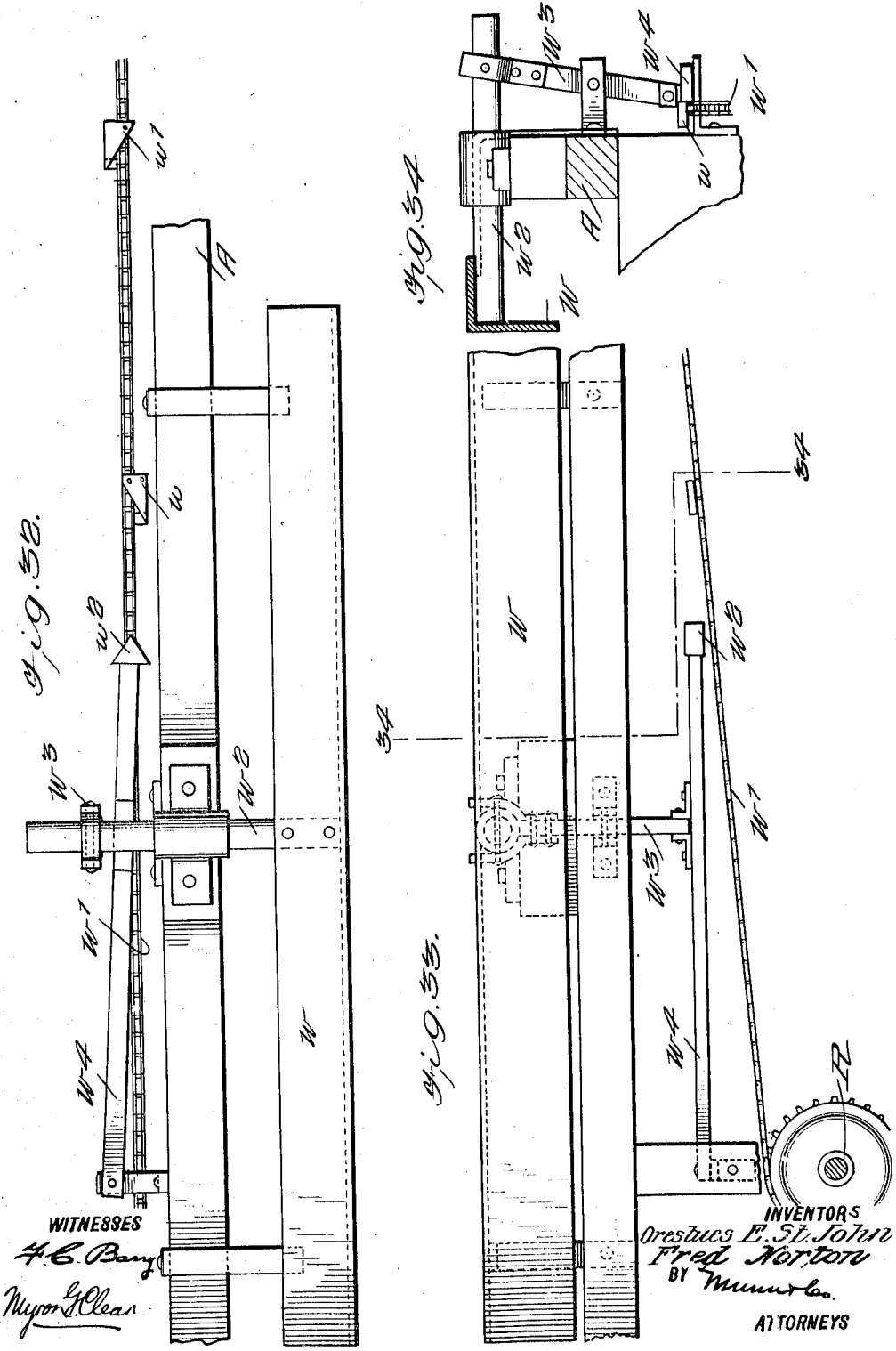

UNITED STATES PATENT OFFICE.

ORESTUES E. ST. JOHN AND FRED NORTON, OF ROCK CREEK, OHIO.

MACHINE FOR MAKING BASKET-BLANKS.

1,161,749.  Specification of Letters Patent.  Patented Nov. 23, 1915.

Application filed June 10, 1914. Serial No. 844,195.

*To all whom it may concern:*

Be it known that we, ORESTUES E. ST. JOHN and FRED NORTON, citizens of the United States, and residents of Rock Creek, in the county of Ashtabula and State of Ohio, have invented an Improvement in Machines for Making Basket-Blanks, of which the following is a specification.

Our present invention relates to weaving machines, and more particularly to a machine for weaving splints to form blanks from which the usual splint baskets are thereafter made up.

The primary object of our invention is to provide a machine capable of a continuous automatic operation from the time when the splints are fed into the machine, until the woven blank is discharged therefrom.

A further object of our invention is to provide a machine which will weave splints into basket blanks of uniform shape and dimension irrespective of irregular width of the splints themselves or irregular or broken edges thereof.

Many other objects of our invention, with their resulting advantages will clearly appear in the course of the following description, in which reference is made to the accompanying drawings, forming a part of this specification, and in which—

Figure 1 is a side elevation of the complete machine. Fig. 2 is a side elevation on an enlarged scale of the forward end or discharge portion of the machine. Fig. 3 is a similar view of the intermediate portion of the machine where the weaving operation takes place. Fig. 4 is a similar view of the rear end portion of the machine where the longitudinal splints are fed into their magazines. Fig. 5 is a plan view of substantially that portion of the machine shown in Fig. 2. Fig. 6 is a plan view of substantially that portion of the machine shown in Fig. 3. Fig. 7 is a similar view of substantially that portion of the machine shown in Fig. 4. Fig. 8 is a sectional side elevation of the mechanism utilized to intermittently shift a slidable cross head guide in controlling the placed positions of the transverse splints, taken substantially on line 8—8 of Fig. 6. Fig. 9 is a transverse vertical section taken substantially on line 9—9 of Fig. 8 with the conveyer table removed. Fig. 10 is a detail perspective view showing a portion of the shiftable cross head guide and a part of one of its guide rods. Fig. 11 is a longitudinal section through the weaving mechanism, taken substantially on line 11—11 of Fig. 6 and showing the means for elevating the rear ends of alternate longitudinal splints. Fig. 12 is a similar view on an enlarged scale taken substantially on line 12—12 of Fig. 6. Fig. 13 is a transverse vertical section taken substantially on line 13—13 of Figs. 6 and 12. Fig. 14 is a perspective view of the rear end portion of one of the stationary splint guides. Fig. 15 is a transverse section therethrough taken substantially on line 15—15 of Fig. 14. Figs. 16 and 17 are respectively a plan and side elevation of one of the actuating members for setting the transverse splints properly in the blank. Fig. 18 is a detail perspective view of one of the longitudinal splint lifting members removed. Fig. 19 is a perspective view of one of the presser arms for the rear ends of the longitudinal splints removed. Fig. 20 is a vertical longitudinal section taken substantially on line 20—20 of Fig. 6 and illustrating the means for raising the forward and rear sets of presser arms. Fig. 21 is a transverse vertical section taken substantially on line 21—21 of Fig. 20. Fig. 22 is a perspective view of one of the lifting shoes for the forward set of presser arms, with a portion of its actuating chain. Fig. 23 is a similar view of a portion of one of the lifting shoes for the rear set of presser arms, with a portion of its actuating chain. Fig. 24 is a horizontal section taken substantially on line 24—24 of Fig. 20. Figs. 25 and 26 are respectively a side elevation and a plan view of one of the operating members attached to the chain shown in Fig. 23. Fig. 27 is a vertical longitudinal section taken substantially on line 27—27 of Fig. 6 and illustrating the means for effecting an intermittent movement of the longitudinal splint carrying chains. Fig. 28 is a plan view of the parts shown in Fig. 27. Fig. 29 is a vertical transverse section taken substantially on line 29—29 of Fig. 27. Fig. 30 is a perspective view of the stop for the intermittently moving longitudinal splint carrying chains. Fig. 31 is a similar view of one of the laterally projecting lugs of the intermittently moving chains actuating the longitudinal splint carrying chains. Fig. 32 is a plan view of the splint guiding arrangement for offsetting certain of the lateral splints. Fig. 33 is a sectional side elevation of the parts shown in Fig. 32, taken substantially on line 33—33 of Fig. 7. Fig. 34 is a transverse vertical section taken therethrough substantially on line 34—34 of Fig. 33. Figs. 35 and 36 are respectively a plan and side elevation of one of the discharge strips of the longitudinal splint feeding chains, and Fig. 37 is a plan view of the basket blank formed by our improved machine.

Referring now to the figures in general it will be seen that we provide a main supporting frame A along the top of which is mounted a table B and centrally above which main frame and table is superposed a supplemental frame C in which is mounted certain parts of the weaving mechanism which, as will be hereinafter shown, is confined within an area of the apparatus immediately adjacent to the supplemental frame just mentioned.

As best seen by reference to Figs. 5 to 7 inclusive and Fig. 13, the table B consists of a plurality of longitudinal strips $b$ having central longitudinal grooves $b'$ in their upper surfaces and separated by upright metal strips $b^2$, the upper edges of which metal strips $b^2$ extend some distance above the upper surface of the table strips $b$. There is thus formed a plurality of channels upon the upper surface of the table B in which the several longitudinal splints of the blank are disposed and movable.

By reference to Fig. 37 it will be seen that the blank formed with our improved machine consists of eight longitudinal splints D and a similar number of lateral or transverse splints D' interwoven to form a body fabric and with their ends projecting, it being noted that four splints of each of the series of longitudinal and lateral or transverse splints are offset in their length with respect to the other four of the series in order that the finished blank may be properly manipulated to finish off the basket ends when disposed on a basket form.

Referring now to Figs. 1 to 7 inclusive it will be seen that there are a pair of shafts E and E' journaled upon respectively opposite ends of the main frame A and in the upper portion thereof, on which shafts are secured a series of sprocket wheels $E^2$ corresponding in number with the channels of the table and around which are mounted endless conveying chains $E^3$ which travel in the grooves $b'$ of the table before mentioned (see Fig. 13) and are provided with sets of projecting lugs $e$ spaced apart and the spaces between which lugs form magazines for the longitudinal splints disposed as before mentioned within the space between the metal table strips $b'$, one of these longitudinal splints being shown in place in Fig. 7 at the point where the series of longitudinal splints for making a blank are fed onto the table, it being noted by reference to Figs. 5, 6 and 7 that the series of chain lugs $e$ are so disposed as that four lugs of each transverse series are offset in a longitudinal direction with respect to the other four, thus providing for the relation of the longitudinal splints as before described in connection with the finished blank in Fig. 37.

The several conveyer chains $E^3$ are intermittently moved and the longitudinal splints are laid in the spaces between the lugs $e$ of the chains when the latter are stationary and at the point shown in Fig. 7 as just stated, this intermittent movement of the conveyer chains being accomplished by means which will now be described.

Power is supplied to the apparatus from any suitable source to a pulley F' mounted upon a transverse shaft F journaled in the lower forward portion of the main frame A and connected, by a sprocket chain $F^2$, to an upper intermediate shaft G also journaled transversely in the main frame A, this shaft G being provided, beyond the right hand side of the table B, with a pair of sprocket wheels G' as shown in Figs. 6 and 27. These sprocket wheels G' which are spaced apart, are connected by longitudinal parallel chains $G^2$ to a pair of sprocket wheels H' similarly spaced apart and secured upon a shaft H mounted transversely upon the upper portion of the main frame A adjacent its rear end, as best shown in Fig. 7.

The shafts E and E' of the conveyer chains are also extended and provided with sprocket wheels $E^4$, at the right of the table B, connected by a sprocket chain $E^5$ which extends between the sprocket chains $G^2$ as clearly seen by reference to Figs. 5, 6 and 7 and as shown in detail in Figs. 28 and 29.

The chain $E^5$ has laterally projecting horizontal members $E^6$, one of which is shown in detail in Fig. 31, secured thereon at spaced points and adapted to be engaged by lugs $G^3$ carried by the chains $G^2$, and as best shown in Figs. 6, 27 and 28, it being noted that these latter chains are continuously movable through the driving connections before stated. The lugs $G^3$ engage a lug $E^6$ at a point shown at the right in Fig. 27, immediately after these lugs $G^3$ which are pivotally connected at their forward ends to their respective chains $G^2$ have been elevated by engagement upon a platform I, upon which they move as shown in Figs. 27 and 28. Thus the lugs $G^3$ move the chain $E^5$ and consequently the several conveyer chains $E^3$, of the table B, to the point shown at the left in Fig. 27 where lugs $G^3$ ride off of the forward end of the platform I and are thus allowed to drop to the position shown in dotted lines, releasing the lug $E^6$ with which they were previously engaged. At this time the next rearmost lug $E^6$ of the chain $E^5$ has come to a position from which the previous one was moved and the chain $E^5$ and the several conveyer chains $E^3$ are stopped at precisely the desired point or in other words are prevented from moving beyond the desired point through their own momentum, by a stop J pivotally mounted at $j$ at its forward end within a cut out portion of the platform I, as seen in Figs. 27 to 30, and elevated in the path of movement of the lug $E^6$ at the proper time, by the means shown in Figs. 27 and 29, the stop itself being shown in detail in Fig. 30.

The shaft G which carries the sprocket wheels G' before mentioned is also provided with a small sprocket wheel K, below chain $E^5$ and connected, by a sprocket chain K', to an intermediate transverse shaft R, and this chain K', which is also immediately below the upper run of the chain $E^5$, is provided with a lug $K^3$ which comes beneath the rear end of the stop J at the proper time and raises the stop to a point above the surface of the platform I. Thus each time the lugs $G^3$ of the chains $G^2$ come onto the platform I and engage the proper lug $E^6$ of the chain $E^5$ as described above, this latter chain together with the several conveyer chains $E^3$ is moved forwardly the desired distance to feed a set of longitudinal splints within the weaving mechanism and a finished blank out of the mechanism.

As before stated the longitudinal splints are laid in the magazines formed on the conveyer chains as soon as a series of these magazines are ready for their reception at the rear end of the machine as shown in Fig. 7 and it is to be understood that two intermittent movements of the conveyer chains are required to carry these splints so placed within the weaving mechanism located substantially centrally of the machine and likewise two movements are required to carry the finished blank out of the machine and effect its discharge.

It will be noted from Figs. 1, 2 and 7, that the two outer conveyer chains $E^3$, at the right and left hand sides of the machine, are provided with supplemental strips $E^7$, shown in detail in Figs. 35 and 36, secured at their forward ends to their respective chains so that when, after passage through the weaving mechanism, the finished blank approaches the forward end of the machine, the strips $E^7$ being attached only at their forward ends will turn the finished blank over into a receiving rack L or other suitable receptacle for the finished blanks, see dotted lines in Fig. 2, disposed at the forward end of the machine and best shown in Figs. 1 and 2.

When, through two successive intermittent movements of the magazine chains $E^3$, the series of longitudinal splints D placed in the magazine chains at the point indicated in Fig. 7 and as previously described, are moved beneath the supplemental frame C, and brought to a stand-still in such position, the forward and rear ends of the several longitudinal splints are respectively clamped by forward and rear sets of presser arms M and N, as best shown in Figs. 11 and 12. The forward series of presser arms M are intermediately fulcrumed upon a transverse rod M' and controlled by springs $m$ to normally hold their inner ends downwardly upon the forward ends of the splints, and the rear set of presser arms N are similarly fulcrumed upon a rod N' and controlled by springs $n$, all as best shown in Figs. 11, 12 and 13. During the movement of the series of longitudinal splints into the space as just mentioned, however, the several presser arms M and N are raised, and thereafter, during the weaving operation, the rear ends of alternate longitudinal splints are also raised to permit the introduction of lateral splints which are carried toward the rear ends of the longitudinal splints upon continuously moving chains O, movable longitudinally, and upon opposite sides, of the table B, as shown in Figs. 3, 4, 6, 7, 11 and 13, with their forward ends around sprocket wheels on the shaft G and their rear ends around sprocket wheels on the shaft H as will be seen by a comparison of Figs. 3, 4, 6, and 7. These chains O carry a series of pivoted lugs O' and in advance of each transversely alined pair of such lugs, a transverse or lateral splint D' is placed as shown in Figs. 11 and 12.

As each transverse or lateral splint D' approaches the rear ends of the longitudinal splints in the weaving mechanism as shown in Fig. 12, the rear ends of alternate of these longitudinal splints are raised by means of a transverse series of arms P, best shown in Figs. 11 and 12 and illustrated in detail in Fig. 18, pivoted at $p$ at their rear ends beneath the table B and having upwardly inclined forward ends $p'$ extending vertically through slots in the table and beneath the rear ends of the several longitudinal splints.

A series of chains Q extend around sprocket wheels Q' on the shaft G before mentioned and around the sprocket wheels $Q^2$ on the shaft R as seen in Fig. 11, these several chains Q being alined below members P and provided with lugs $q$ properly placed to lift certain of the arms P by passing thereunder, thereby forcing the rear ends of the respective longitudinal splints and the respective presser arms N upwardly, against the tension of the springs n, of said presser arms. Thus with the rear ends of certain of the longitudinal splints raised and the rear ends of the other splints held down as shown in Figs. 11 and 12 provision is made to receive a lateral splint therebetween.

In the weaving operation each transverse or lateral splint D' is carried by the respective lugs O' before mentioned until it is substantially in the position shown in dotted lines in Fig. 12 and but a short distance in the space between the raised and lowered rear ends of the alternate longitudinal splints. At this point each lateral or transverse splint is released by downward pivotal movement of the lugs O' off of the forward ends of side rails O² upon which they travel, as shown in Figs. 11 and 13, and by which rails they are normally held upright. These lateral splints are released in the position shown in dotted lines in Figs. 11 and 12, and at the same time all of the rear presser arms N are raised to permit of further movement of such splints, by upward movement of uprights N², the upper ends of which are connected to a cross bar N³ in turn connected to the lower forward ends of the several presser arms N by chains N⁴ as will be clearly seen by reference to Figs. 11, 12 and 20 to 24 inclusive. The lower angular ends n' of the uprights N² rest upon shoe bars N⁵ beneath which travel chains N⁶ having their forward and rear ends mounted around sprocket wheels on the shafts G and R and provided with a plurality of lugs n³ which when they pass beneath the shoes N⁵ raise the latter and thus simultaneously lift the entire series of rear presser arms N. This causes the rear ends of all of the longitudinal splints to be released and permits of continued movement of each lateral splint within the blank, after its release in the position shown in dotted lines in Fig. 12 and after its engagement by angular lugs or arms S' pivotally mounted upon chains S, the lower runs of which chains pass longitudinally over the blank as it is being formed.

It will be noted from Figs. 11 and 12 that as each of the lateral or transverse splints D' is brought to the position shown in dotted lines in Fig. 12, it is permitted to drop into cut out portions b³ of the several metal table strips b² and that the several longitudinal splints are prevented from lateral displacement when raised adjacent these cut out portions, by means of longitudinal stationary splint guides D², each consisting of a bar extending above and along one of the metal table strips b² with its rear curved end d resting on a cross rod D³, as seen in Fig. 13. One of these guide bars D² is shown in detail in Figs. 14 and 15.

The chains S above referred to, extend around sprocket wheels S² and S³, the sprocket wheels S² of which are secured upon a shaft T and the sprocket wheels S³ of which are loosely mounted upon a shaft T', these shafts being respectively journaled in the forward and rear portions of the supplemental frame C before mentioned, all as shown in Figs. 11 and 12. Thus the several lugs or arms S' depend by gravity and from the lower runs of the chains S into engagement with the lateral or transverse splints in order to carry the same forwardly into the blank and are released at the proper point within the blank by their engagement with the cross head U which causes their pivotal movement in an upward direction as shown in dotted lines in Fig. 12, this cross head U having a rearward step by step movement during the formation of each blank through the means which will now be described.

Referring now to Figs. 8, 9 and 10, the cross head U is journaled to slide upon longitudinal guide rods U' and is secured adjacent its ends to chains U² passing around sprocket wheels U³ and U⁴ upon opposite sides of the table B, which sprocket wheels are respectively mounted upon the shafts T and T' before mentioned, sprocket wheels U³ being loosely mounted upon the shaft T and sprocket wheels U⁴ being secured upon the shaft T'. Mounted also on the shaft T', at its left hand end as seen in Fig. 6, is a wheel U⁵ having a series of teeth u, as clearly shown in Figs. 3 and 8, which are successively engaged during the weaving operation by lugs u' mounted upon a chain U⁶ extending around sprocket wheels u² and u³ respectively secured upon shafts V and V', the former of which is driven from the shaft T by a chain V² as clearly shown in Fig. 3, which shaft T, actuating the chains S, is driven by a chain T² extending around sprocket wheels mounted on the shaft G before mentioned and a shaft T³ mounted in the upper portion of the supplemental frame C. Thus each time a lug u' engages a tooth u of the wheel U⁵, the cross head U is moved rearwardly into proper position to release the arms S' from the incoming transverse or lateral splints so that the several lateral splints will be positioned at just the proper point irrespective of their particular width or any irregularity of their edges. When the several lugs u' have successively operated the toothed wheel U⁵, the next arm S', engaging the cross head, will carry the latter forwardly with the chains U² and toothed wheel U⁵, as the finished blank is being removed, in order to set the parts ready for the next weaving operation.

When the blank has been completed the magazine chains will be started and the blank carried out after the several presser arms M and N are simultaneously raised by the means shown in Figs. 20 to 24 inclusive. Like the presser arms N, the series of presser arms M are connected adjacent their lower rear ends to chains m' depending from a cross bar M², which cross bar is disposed upon the forward ends of intermediately pivoted levers M³, the intermediate pivots m² of which are shown in Fig. 20, and the rear ends of which levers are connected by connecting rods M⁴ to the forward ends of levers M⁵ intermediately pivoted at m³ and having their rear ends pivotally connected to the upper ends of uprights M⁶. The lower ends of these uprights M⁶ are pivotally connected to shoe bars M⁷ pivotally mounted at their forward ends, to the sides of the frame A as seen in Fig. 6, and having their rear ends above chains M⁸ traveling around sprocket wheels on the shafts G and R and provided with a single lug m⁴ for lifting the rear ends of the shoe bars at the proper time, it being seen from Figs. 21 and 22 that the lower ends of the uprights N² of the rear presser arms N also rest upon the shoe bar M⁷ so that the two sets of presser arms are simultaneously raised to permit forward movement of the finished blank out of the weaving mechanism.

The transverse or lateral splints D' are fed into the machine and laid across the longitudinal magazine chains E³ in advance of the lugs O' of the chains O as before stated, by an operator standing upon the left hand side of the frame of the apparatus and by placing the opposite ends of the splints against a guide W as shown in Fig. 7 and again in detail in Figs. 32 to 34 inclusive.

Referring now to Figs. 6 and 7, a chain W' travels at the right hand side of the machine and on sprocket wheels mounted upon the before mentioned shafts H and R and is provided with a pair of lugs w and w' having inclined cam faces turned in relatively opposite directions. The guide W consists of a bar secured at an intermediate point to a shaft or rod W² movable through a bearing on the main frame as shown in Figs. 32 and 34 and pivotally connected adjacent its outer end to the upper end of an intermediately pivoted lever W³. The lower end of this lever W³ is similarly connected to an adjusting bar W⁴ having its rear spear-shaped head w² disposed in the path of movement of the lugs w and w'. In this manner the first four transverse or lateral splints are laid with their outer ends against the guide bar W when the latter is in its outer adjusted position after which the lug w engages the end of the adjusting bar W⁴ and thereby moves the guide bar W inwardly so that the next four lateral or transverse splints laid with their ends thereagainst will be offset from the first four as is desired and as shown in the finished blank as illustrated in Fig. 37. From this it will be seen that the offsetting of the splints of the longitudinal and lateral series is accomplished, in the former instance by means of the particular lugs of the magazine chains and the manner in which they are arranged thereon and in the latter case by the automatically movable guide bar W.

In the operation of the entire device it will be seen that as each set of longitudinal series of splints is carried into the braiding mechanism and clamped by means of the presser arms M and N, the lateral splints are moved into the wearing mechanism one at a time. The several presser bars M engage and hold the forward ends of the longitudinal splints during the entire weaving operation although it will be understood from the foregoing that the presser arms N are successively moved during the entrance of each lateral or transverse splint, first when alternate longitudinal splints are raised to provide for the initial entrance of the lateral splints and then to a common raised position to permit the further movement of the lateral splints fully into the blank.

It will be further seen that by means of the intermittently adjustable cross head U, the several lateral or transverse splints are released in the blank at precisely the desired point, without regard to, and unaffected by, an accidental increase or decrease in width of such splints, or misshapen, broken edges thereof.

It will be further understood that when the weaving operation is complete the entire series of presser arms M and N will be raised as movement of the magazine chains is started. When each blank arrives at the forward discharge end of the conveyer table, it is turned over into the receiving rack L by the magazine strips E⁷.

In the manner we have shown and described the several operations necessary in the weaving of each basket blank are accomplished in a highly effective manner at once continuous and wholly automatic, the end of each operation leaving the parts immediately in position for action upon the succeeding set of splints fed thereto simultaneously with the removal of the finished blank.

It will be further seen that the several operations take place through the use of driving means in the form of sprocket chains and sprocket wheels of which latter it is to be noted by reference to the several figures, there are but two sizes.

We claim.

1. In a splint weaving apparatus of the character described, the combination of a weaving mechanism, means whereby to convey a series of longitudinal splints into the said mechanism at one and the same time and including a plurality of endless chain conveyers mounted to travel beneath the said mechanism and having spaced upstanding lugs forming magazine spaces between them in which the said longitudinal splints are disposed, means for imparting an intermittent movement to the said conveyer chains, a conveyer table beneath the said mechanism and upon which the upper runs of the said conveyer chains are adapted to travel, and means whereby to convey lateral or transverse splints into the said mechanism one at a time and including constantly moving conveyer chains at opposite sides of the said conveyer table having upstanding lugs in advance of which the several lateral or transverse splints are disposed.

2. In a splint weaving apparatus of the character described, the combination of a weaving mechanism, means whereby to convey a series of longitudinal splints into the weaving mechanism at one and the same time, including a plurality of conveyer chains, and means for imparting a simultaneous step by step movement to said chains, each of the said chains being provided with spaced upstanding lugs in its length forming magazines between them for the reception of longitudinal splints, the lugs of certain of the said chains being offset with respect to those of the other chains, a table extending beneath the said weaving mechanism and having a plurality of longitudinal grooves in its upper surface in which the upper runs of the several chains are adapted to travel, said table also having spaced parallel strips extending upwardly therefrom and forming independent channels for the splints carried by the chains whereby to prevent their lateral displacement, and means whereby to convey lateral or transverse splints into the weaving mechanism one at a time.

3. In a splint weaving apparatus of the character described, the combination of a supporting frame, a conveyer table mounted longitudinally above the frame, transverse shafts mounted at the opposite ends of the frame and in its upper portion adjacent to the ends of the table, a plurality of sprocket wheels mounted upon the said shafts, driving connections for imparting intermittent movement to the said shafts, a plurality of endless sprocket chains mounted around the said sprocket wheels and having their upper runs traveling upon the said table, said sprocket chains being provided with spaced upright lugs forming magazines between them for the reception of longitudinal splints, a weaving mechanism operating intermediate the ends of the table and into which the longitudinal splints are intermittently fed in series by the said conveyer chains, and constantly moving means for conveying lateral or transverse splints into the weaving mechanism, all as described.

4. In a weaving apparatus of the character described, the combination of a weaving mechanism, a conveyer table extending through the weaving mechanism, endless chains traveling on the conveyer table to convey longitudinal splints into the said mechanism, transverse shafts mounted adjacent the ends of the table and having sprocket wheels upon which the conveyer chains travel, other sprocket wheels mounted upon the said shafts, an endless chain disposed around the last-mentioned sprocket wheels at one side of the table and provided with a series of spaced laterally projecting arms, chains mounted intermediately, and upon opposite sides of, said last-mentioned chain and provided with spaced lugs to successively engage and move the said arms and their chain, driving means for the actuating chains, and constantly moving means for conveying lateral or transverse splints into the weaving mechanism, all as described.

5. In a weaving apparatus of the character described, the combination of a weaving mechanism, a plurality of endless conveying chains mounted to travel through the weaving mechanism for feeding longitudinal splints thereto, means for imparting simultaneously intermittent movement to the said conveyer chains, and constantly moving chains mounted to travel at opposite sides of the series of intermittently moving chains and having spaced upright lugs for feeding lateral or transverse splints one at a time into the mechanism, all as described.

6. In a splint weaving apparatus of the character described, the combination of a weaving mechanism, a conveyer table extending through the said mechanism and upon which longitudinal splints may be fed to the mechanism, conveyer chains movable at opposite sides of the table and provided with upstanding lugs in advance of which the lateral or transverse splints are laid for movement into the said mechanism, a laterally movable splint guide arranged at one side of the conveyer table and against which the ends of the lateral or transverse splints are disposed, and means for automatically adjusting the position of the said splint guide whereby to offset certain of the lateral splints with respect to the others, for the purpose described.

7. In a splint weaving apparatus of the character described, the combination of a weaving mechanism, a conveyer table extending through the said mechanism and upon which longitudinal splints are fed to the mechanism, conveyer chains movable along opposite sides of the table and across which the lateral splints are disposed for movement into the weaving mechanism, a laterally movable guide bar disposed at one side of the table and against which the ends of the lateral splints are extended, an adjusting bar having connections for moving the said guide bar toward and away from the table to offset certain of the lateral splints with respect to the others, and a constantly moving endless chain having oppositely inclined lugs to engage and move the adjusting bar in relatively opposite directions, for the purpose set forth.

8. In a weaving apparatus of the character described, the combination of a frame, weaving mechanism mounted intermediate the ends of the frame, a conveyer table mounted longitudinally upon the frame and through the weaving mechanism and upon which longitudinal splints are fed to the said mechanism, endless chains operating at opposite sides of the table for feeding lateral splints into the said mechanism, a guide bar disposed longitudinally, and upon one side, of the conveyer table and against which the ends of the lateral splints are extended, a rod journaled on the frame and to which the said guide bar is connected, said rod being movable toward and away from the table, an intermediately pivoted lever pivotally connected at its upper end to the said movable rod, an adjusting bar intermediate the ends of which the lower end of the said lever is pivotally connected, said adjusting bar being pivoted at one end and having a spear shaped head at its opposite end, and an endless actuating chain having spaced lugs inclined in relatively opposite directions and movable successively into engagement with the spear shaped head of the adjusting bar in order to move the adjusting bar, and consequently the guide bar, toward and away from the conveyer table, for the purpose set forth.

9. In a weaving apparatus of the character described, the combination of a longitudinal conveyer table, means for feeding longitudinal and transverse splints upon the table, and a weaving mechanism operating intermediate the ends of the table and including sets of presser arms for clamping engagement with the forward and rear ends of the longitudinal splints, and means for raising the ends of alternate longitudinal splints against the tension of the said presser arms to permit of movement of the transverse splints therebetween, as set forth.

10. In a splint weaving apparatus of the character described, the combination of a weaving mechanism, means for feeding longitudinal and transverse splints to the weaving mechanism, said longitudinal splint feeding means including a plurality of endless chains movable through the weaving mechanism, and means for intermittently moving said chains, and supplemental strips pivotally connected at their forward ends to certain of the said chains whereby to turn the finished blank over and discharge the same at the forward ends of the said conveyer chains, for the purpose set forth.

11. In a splint weaving apparatus of the character described, the combination of a conveyer table, longitudinal and transverse splint feeding means movable along the table, and a weaving mechanism operating intermediate the ends of the table and including means for clamping the longitudinal splints on the conveyer table, means for raising the rear ends of alternate longitudinal splints against the tension of the said clamping means, means to take the transverse splints from the said splint feeding means and carry the same between the parted longitudinal splints, adjustable means for effecting the release of the transverse splints at the proper point in the weaving mechanism, and means for releasing the said longitudinal splint clamping means when the blank has been completed.

12. In a weaving apparatus of the character described, the combination of a conveyer table, means for feeding longitudinal and transverse splints along the table, and a weaving mechanism operating intermediate the ends of the table to receive the longitudinal and transverse splints, said weaving mechanism including forward and rear sets of presser arms for clampingly engaging the respective ends of the longitudinal splints, means for independently raising the rear set of presser arms upon the reception of each of the transverse splints, and means for simultaneously raising the forward and rear sets of presser arms when longitudinal splints are fed into the weaving mechanism and a finished blank is discharged from such mechanism.

13. In a weaving apparatus of the character described, the combination of a conveyer table, means for feeding longitudinal and transverse splints along the said table, and a weaving mechanism operating intermediate the ends of the table to receive the said splints and including forward and rear sets of spring actuated presser arms for clampingly engaging the respective ends of the longitudinal splints, transverse bars above the sets of presser arms and from which the latter are flexibly suspended, uprights to the upper ends of which the said hanger bars are connected, shoe bars upon which the lower ends of the said uprights are disposed, and endless chains provided with spaced lugs engageable with the said shoe bars whereby to raise the same and the said hanger bars and thereby lift the sets of presser arms out of engagement with the longitudinal splints, as set forth.

14. In a splint weaving machine of the character described, a weaving mechanism including means for clamping the relatively opposite ends of a series of splints extended longitudinally into the mechanism, means for parting alternate longitudinal splints at one end, means for engaging and moving transverse splints successively disposed between the parted ends of the longitudinal splints, an adjustable member for effecting the release of the said transverse splint moving means at the proper points, and means for imparting a step by step movement to the said adjustable member, all as set forth.

15. In a splint weaving apparatus of the character described, the combination of means for feeding longitudinal and transverse splints, and a weaving mechanism including front and rear sets of presser arms, springs controlling the said presser arms and for clampingly engaging the same with the respective ends of the longitudinal splints, a hanger bar extending transversely above each of the series of presser arms and connected thereto by flexible means, uprights connected to each of the hanger bars, a shoe bar upon which the uprights of the front presser arms rest, an endless chain having projecting lugs for raising the shoe bar to lift the front presser arms, a shoe bar upon which the uprights of the rear presser arms rest, another chain having projecting lugs for raising the last-named shoe bar to lift the rear presser arms, said uprights of the rear presser arms also resting upon the shoe bar of the forward presser arms whereby when the latter shoe bar is raised both the front and rear sets of presser arms will be lifted, means for parting the rear ends of alternate longitudinal splints, and means for moving the transverse splints between the parted longitudinal splints, all as set forth.

16. In a splint weaving apparatus of the character described, a weaving mechanism including means for clamping the relatively opposite ends of a series of longitudinal splints, means for parting the said longitudinal splints at one end, means for moving transverse splints between the parted longitudinal splints, and means for releasing the transverse splints in proper position including a member having a step by step movement in a direction relatively opposite to that of the moving transverse splints, all as described.

17. In a splint weaving apparatus of the character described, a weaving mechanism including means for clamping the relatively opposite ends of a series of longitudinal splints, means for parting said longitudinal splints at one end, means for feeding transverse splints one at a time to the parted ends of the longitudinal splints, means for engaging and moving the transverse splints so fed to proper positions within the blank, and means for releasing the longitudinal splint clamping means to permit the finished blank to be discharged.

18. In a splint weaving apparatus of the character described, a weaving mechanism including means for clamping a series of longitudinal splints, means for parting said splints at one end, means for moving transverse splints between the parted longitudinal splints, a member movable in the path of said transverse splint moving means to release the transverse splints, and means for imparting a step by step movement to said releasing member, all as set forth.

19. In a splint weaving apparatus of the character described, a weaving mechanism including means for clamping a series of longitudinal splints, means for parting the longitudinal splints at one end, means for moving transverse splints within the parted longitudinal splints, and comprising endless chains and angular arms pivotally mounted on the chains, a cross head slidably mounted in the path of movement of the said angular arms, and means whereby to impart a step by step movement to the cross head in a direction relatively opposite to that of the movement of the transverse splint moving arms, all as described.

20. In a splint weaving apparatus of the character described, weaving mechanism including means for clamping a series of longitudinal splints, means for parting the longitudinal splints at one end, means for feeding and disposing the transverse splints between the parted ends of the longitudinal splints, a pair of transverse shafts, driving connections for rotating one of the said shafts, sprocket wheels secured on the said driven shaft, sprocket wheels mounted loose on the other shaft, endless chains disposed around the said sprocket wheels, angular arms pivotally connected to the chains and movable therewith to engage and move the transverse splints within the blank, other sprocket wheels mounted loose on the driven shaft, other sprocket wheels secured on the other shaft, a toothed wheel secured also upon the latter shaft, sprocket chains extending around the last-mentioned sprocket wheels, a cross head having a slidable movement and secured to the last-mentioned chains, and an endless chain having a plurality of lugs engageable with the teeth of the said toothed wheel whereby to impart a step by step movement to the cross head, all for the purpose set forth.

21. In a splint weaving apparatus of the character described, the combination of a conveyer table, a weaving mechanism operating intermediate the ends of the conveyer and including means for flexibly clamping the relatively opposite ends of a series of longitudinal splints upon the table, a plurality of lifting arms pivotally mounted below the table and having angular ends operating through the table below the rear ends of the longitudinal splints, a plurality of endless chains traveling below the said lifting arms and provided with upright lugs for engagement with, and to elevate the said lifting arms, whereby to raise the rear ends of selected longitudinal splints and thus part the latter, and means for moving transverse splints successively into the longitudinal splints, means for feeding longitudinal splints into the weaving mechanism, and means for feeding transverse splints to the parted ends of the longitudinal splints, all as set forth.

ORESTUES E. ST. JOHN.
FRED NORTON.

Witnesses:
 LANT C. PERRY,
 HARRY W. MILLER.